United States Patent

Dagwell

[15] 3,638,956

[45] Feb. 1, 1972

[54] STUFFING BOXES

[72] Inventor: Harold Lloyd Dagwell, London, England

[73] Assignee: Henry Sykes Limited, London, England

[22] Filed: Mar. 14, 1969

[21] Appl. No.: 807,381

[30] Foreign Application Priority Data

Mar. 14, 1968 Great Britain...................12,486/68

[52] U.S. Cl..............................277/30, 277/137, 277/105
[51] Int. Cl.....................................................F16j 15/16
[58] Field of Search...................277/30, 34.3, 137, 226, 4, 277/105

[56] References Cited

UNITED STATES PATENTS

| | | | |
|---|---|---|---|
| 2,219,064 | 10/1940 | Boyer et al............................277/30 |
| 2,719,737 | 10/1955 | Fletcher.............................277/34.3 |
| 2,832,614 | 4/1958 | Settle, Jr............................277/226 X |
| 3,050,310 | 8/1962 | Koiken................................277/30 |
| 3,172,671 | 3/1965 | Downs...............................277/137 |
| 2,973,978 | 3/1961 | Oppenheim.........................277/188 |
| 3,249,363 | 5/1966 | Chatfield..............................277/1 |

FOREIGN PATENTS OR APPLICATIONS

| | | | |
|---|---|---|---|
| 679,662 | 2/1964 | Canada...............................277/30 |
| 902,452 | 8/1962 | Great Britain......................277/30 |

Primary Examiner—Samuel B. Rothberg
Attorney—William D. Hall, Elliott I. Pollock, Fred C. Philpitt, George Vande Sande, Charles F. Steininger and Robert R. Priddy

[57] ABSTRACT

A stuffing box assembly between a driving device and a driven device is provided with an annular seal which encircles the cylindrical body of the stuffing box to provide flexible sealing between the cylindrical body and a socket in which it is accommodated, said seal comprising a length of rubberlike material formed into a ring with the then-adjacent ends of the length virtually abutting, whereby the seal can readily be replaced by feeding a fresh length of rubberlike material around the cylindrical body. The stuffing box also comprises a gland member formed with a peripheral recess to receive a stop in the form of a rubberlike sleeve on a bolt to hold the gland member and thus the stuffing box against tendency to turn with a rotating shaft but to permit limited radial movement of the stuffing box.

2 Claims, 2 Drawing Figures

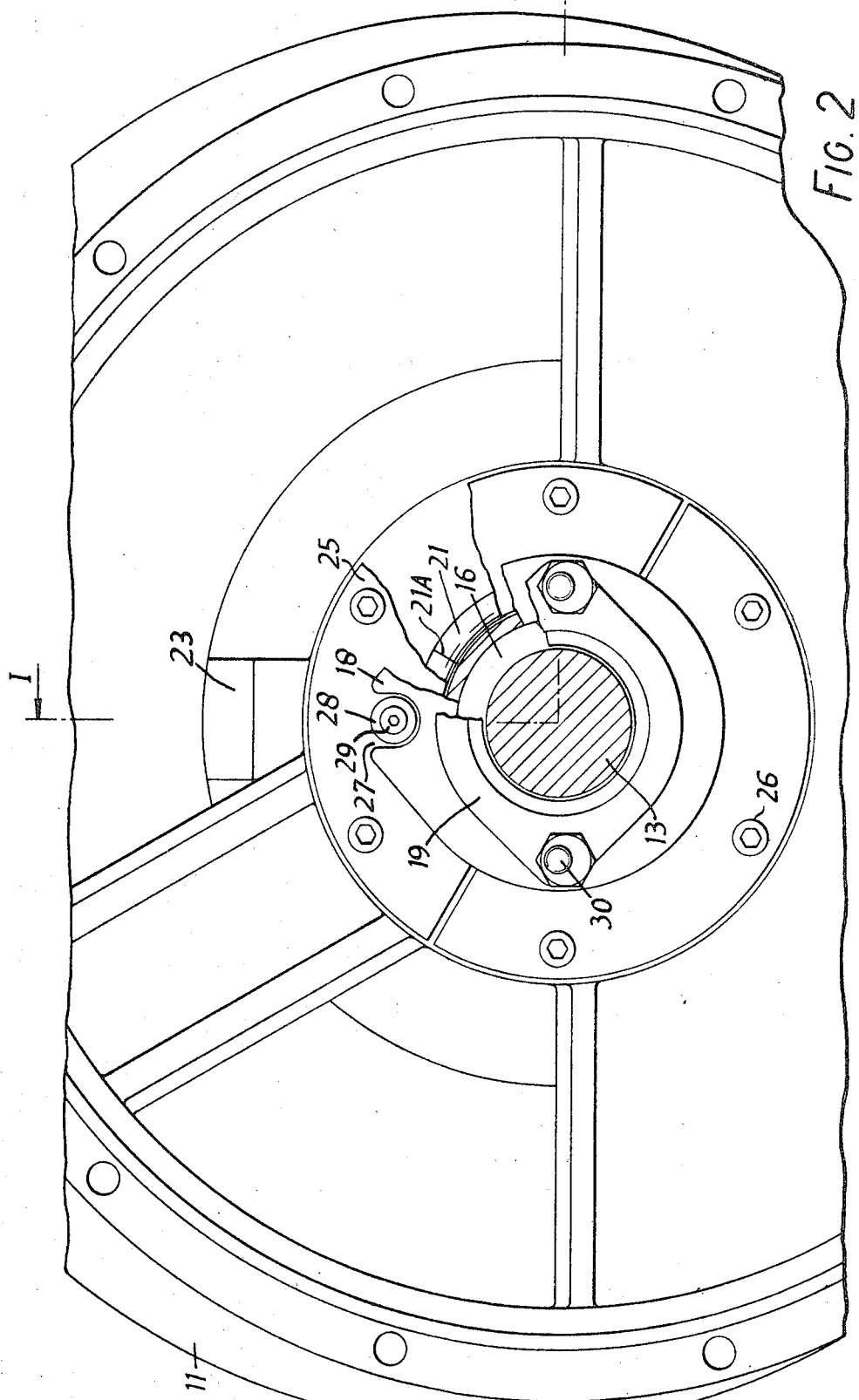

STUFFING BOXES

BACKGROUND OF THE INVENTION

This invention relates to stuffing boxes, particularly for use with power-driven units such as a pump close-coupled with an i.c. engine.

A stuffing box of this general type is described in the specification of our British Pat. No. 902,452, and it will be appreciated that the replacement of the annular sealing rings or flanges between the stuffing box and the housing involve passing the annular seals over the rotary shaft. Thus, for example, in a drive coupling between an i.c. engine and a centrifugal pump, replacement of the endless-ring seals would involve the uncoupling of the shaft which might also involve the removal of at least part of either the pump or the engine.

It is an object of the present invention to provide a stuffing box assembly wherein seals can readily be replaced and which is of simple and reliable construction.

Referring again to Pat. No. 902,452, it is fundamental that the stuffing box should be flexibly mounted to conform to radial movements of the shaft, but it is, of course, necessary to prevent the stuffing box turning with a rotary shaft. It is a further object of the present invention to provide a simple and reliable arrangement for satisfying these requirements.

SUMMARY OF THE INVENTION

According to the present invention there is provided a stuffing box assembly provided with at least one annular seal which encircles a cylindrical stuffing box to provide flexibility and sealing between a socket member and said stuffing box which contains packing and through which a rotating shaft passes, characterized in that said annular seal comprises a length of rubberlike material formed into a ring with the adjacent ends of the length virtually abutting.

The invention also provides, in a stuffing box assembly or the like between a driving device and a driven device, a seal to encircle a cylindrical part and comprising a length of rubberlike material arranged to be formed into a ring with the then-adjacent ends of the length virtually abutting whereby the seal can readily be replaced by feeding a fresh length of rubberlike material around the cylindrical part. Thus, the seals can be removed and replaced without dismantling the apparatus to which they are applied.

By "virtually abutting," it is meant that the ends are in contact with each other over more or less of their cross section or that the ends are separated by a gap which is so small that it is insignificant.

Said length may be of solid circular section, but according to a preferred feature of the invention the length comprises a hollow tube of Viton or like material which may be too hard to form into a satisfactory ring when of solid section.

Further according to the present invention, the stuffing box comprises a gland member formed with a peripheral recess to receive a stop in the form of, for example, a rubberlike sleeve on a bolt, or vice versa, arranged to hold the gland member and thus the stuffing box against any tendency to turn with a rotating shaft but to permit limited radial movement of the gland member and stuffing box.

Other objects and features of the invention will appear from the following description.

DESCRIPTION OF THE PREFERRED EMBODIMENT

Figure 1:
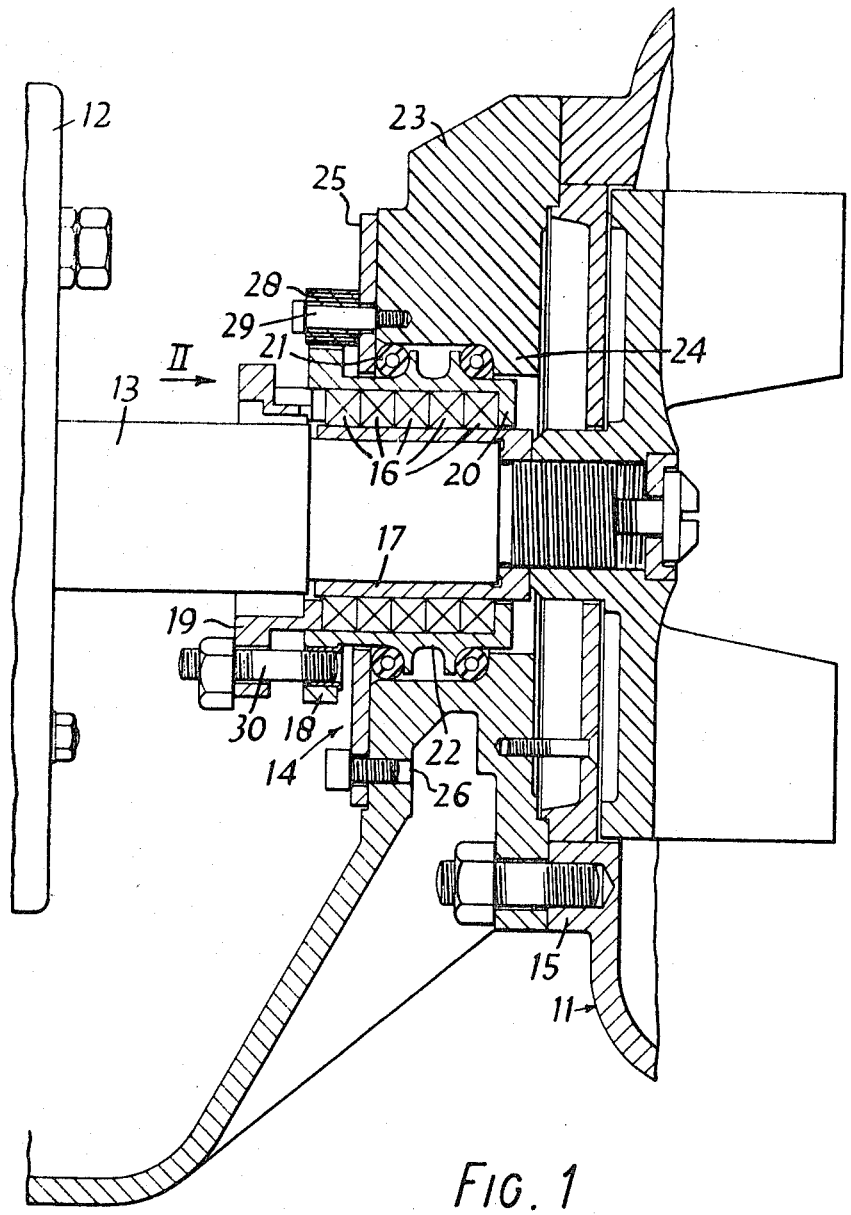
FIG. 1 is a fragmentary sectional view (on the line I—I of FIG. 2) showing a drive shaft between a close-coupled centrifugal pump and i.c. engine and incorporating a stuffing box according to the present invention; and, FIG. 2 is a view in the direction of arrow II in FIG. 1.

Referring to the drawings, a centrifugal pump indicated at 11 is driven by an i.c. engine indicated at 12, through a coupling shaft 13 which also drives an auxiliary vacuum pump (not shown). A stuffing box assembly 14 is provided as an embracing seal for the drive shaft where it enters casing 15 of the centrifugal pump.

The stuffing box assembly 14 comprises a series of five gland-packing rings 16 sandwiched between an inner replaceable sleeve 17 and a sleevelike liner 18, a gland 19 being arranged to compress the rings 16 against end flange 20 of the liner 18.

A pair of sealing rings 21, separated by a channel-section spacer 22 integral with liner 18, are arranged between the liner 18 and casing part 23 which provides a cylindrical recess or socket and is formed with an end flange 24 which is radially spaced form the liner 18. The other end of the annular chamber in which the rings 21 and the spacer 22 are located is closed by a gland-retaining plate 25 which is secured by six bolts 26 to the part 23.

The rings 21 comprise lengths of Viton (manufactured by James Walker & Co. Ltd.) tubing cut so that the ends of each length stand square and may lightly abut (as at 21A in FIG. 2) when the length is wrapped round the liner 18. It has been found that Viton is too hard to be used in a solid length, but that the hollow form shown in the drawing gives very satisfactory results.

The liner 18 is formed with a top recess 27 which accommodates a rubber sleeve 28 carried by a bolt 29 screwed into the part 23. The gland 19 is secured to the liner 18 by means of a pair of bolts 30; only one of the bolts 30 is shown in FIG. 1 and this in a lower position due to the right-angled section of the drawing, whereas the two bolts are, in fact, horizontally aligned with the shaft axis as shown in FIG. 2. It will be appreciated that this arrangement provides a simple means of preventing rotation of the gland and liner, and the enclosed rings 16, in a secure but, nevertheless, radially flexible manner.

In use of the stuffing box assembly according to the present invention, the rings 21 may, from time to time, require to be renewed but they can readily be replaced without substantial dismantling of the parts of the unit. In fact, all that is required is the withdrawal of the gland 19 and liner 18 and the plate 25, after removing the bolts 26, and possibly loosening bolts 30. The worn rings can then be removed and fresh lengths of Viton tubing wrapped round the liner 18 to provide new rings. It will be appreciated that with endless sealing rings it would be necessary to uncouple the shaft 12, which would involve separating the pump and the motor, before the rings could be replaced.

Modifications may be made; for example, a recess 27 may be formed in the part 23 of plate 25, a bolt and sleeve 29/28 then being carried by the liner 18.

We claim:
1. A stuffing box assembly comprising,
   a cylindrical stuffing box containing packing and through which a rotatable shaft passes,
   an outer housing surrounding said stuffing box and spaced therefrom so that the stuffing box is free to move therein in the radial and axial directions,
   two annular seals disposed between the said stuffing box and the outer housing and spaced apart in the direction of the axis of the stuffing box, each annular seal comprising a length of rubberlike material formed into a split ring with the ends of the length virtually abutting,
   first axially extending surfaces formed on the stuffing box and the housing respectively to confine the annular seals between them, whereby the stuffing box is resiliently mounted in the radial direction,
   and second radially extending surfaces formed on the stuffing box and the housing respectively to confine the annular seals between them, whereby the stuffing box is resiliently mounted in the axial direction,
   the said first and second surfaces closely abutting the annular seals to prevent opening out of the split sealing rings,
   said stuffing box comprising a gland member formed with a peripheral recess which receives a stop formed on said housing, and said stop comprising a rubberlike sleeve on a bolt to hold the gland member and thus the stuffing box against any tendency to turn with rotation of said rotatable shaft but permitting limited radial and axial movement of the stuffing box.

2. A stuffing box assembly comprising, a cylindrical stuffing box containing packing and through which a rotatable shaft passes, an outer housing surrounding said stuffing box and spaced therefrom so that the stuffing box is free to move therein in the radial and axial directions, two annular seals disposed between the said stuffing box and the outer housing and spaced apart in the direction of the axis of the stuffing box, each annular seal comprising a length of rubberlike material formed into a split ring with the ends of the length virtually abutting, first axially extending surfaces formed on the stuffing box and the housing respectively to confine the annular seals between them, whereby the stuffing box is resiliently mounted in the radial direction, and second radially extending surfaces formed on the stuffing box and the housing respectively to confine the annular seals between them, whereby the stuffing box is resiliently mounted in the axial direction, the said first and second surfaces closely abutting the annular seals to prevent opening out of the split sealing rings, said stuffing box comprising a gland member formed with a member in the form of a rubberlike sleeve on a bolt to engage in a recess in said housing to hold the gland member and thus the stuffing box against limited radial and axial movement of the stuffing box.

* * * * *